United States Patent
Otake

(10) Patent No.: US 8,730,007 B2
(45) Date of Patent: May 20, 2014

(54) IMAGE PROCESSING APPARATUS, METHOD FOR CONTROLLING THE SAME, AND STORAGE MEDIUM

(75) Inventor: Ritsuko Otake, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 698 days.

(21) Appl. No.: 12/486,677

(22) Filed: Jun. 17, 2009

(65) Prior Publication Data

US 2009/0315674 A1     Dec. 24, 2009

(30) Foreign Application Priority Data

Jun. 24, 2008    (JP) ................................. 2008-164697

(51) Int. Cl.
| | |
|---|---|
| G05B 19/00 | (2006.01) |
| G05B 23/00 | (2006.01) |
| G06K 15/00 | (2006.01) |
| G06F 3/12 | (2006.01) |
| G06K 15/02 | (2006.01) |
| H04N 1/60 | (2006.01) |
| H04N 1/21 | (2006.01) |
| G03G 13/04 | (2006.01) |
| B41J 29/38 | (2006.01) |
| G03G 15/00 | (2006.01) |

(52) U.S. Cl.
USPC ....... 340/5.82; 340/5.86; 358/1.14; 358/1.15; 358/1.2; 358/1.9; 358/296; 347/129; 347/14; 399/45

(58) Field of Classification Search
CPC .............. G06F 21/608; G06F 21/6209; G06F 3/612996; G06F 3/1296; G03G 15/50; G03G 15/5062; G03G 2215/00126; G08C 17/02; H04L 63/08; H04L 63/0861; H04N 21/43637; H04N 1/00838
USPC ............. 340/5.82, 10.2, 10.3, 10.32, 572.1, 340/572.2, 572.4, 10.41, 10.42, 10.51, 340/10.52, 539.13, 10.1, 825.49, 870.11, 340/825.73, 7.21, 572, 505, 825.54, 825.34, 340/825.31, 825.69, 825.72, 572.7; 382/162, 173, 305, 312, 113, 135, 159, 382/161, 175, 181, 190, 229, 232, 241, 251, 382/253; 713/187, 193, 200, 301; 358/474, 358/496, 498, 448, 1.7, 487, 486, 1.15, 358/1.13, 1.14; 347/40, 21, 95

See application file for complete search history.

(56) References Cited

U.S. PATENT DOCUMENTS

| | | | | |
|---|---|---|---|---|
| 7,137,008 | B1* | 11/2006 | Hamid et al. | ................. 713/182 |
| 2002/0181006 | A1* | 12/2002 | Chrisop et al. | ............... 358/1.14 |
| 2004/0186995 | A1* | 9/2004 | Yim et al. | ..................... 713/168 |
| 2004/0225504 | A1* | 11/2004 | Junqua et al. | ................. 704/275 |
| 2006/0197928 | A1* | 9/2006 | Hirai | ............................... 355/30 |

(Continued)

FOREIGN PATENT DOCUMENTS

JP      2004-252501 A     9/2004

*Primary Examiner* — Jennifer Mehmood
*Assistant Examiner* — Mirza Alam
(74) *Attorney, Agent, or Firm* — Canon USA Inc. IP Division

(57) ABSTRACT

A method for controlling an image processing apparatus configured to output image data includes accepting, from a user, selection about whether to permit inputting biometric information, and performing control such that outputting the image data is permitted in a case where the selection for permitting inputting the biometric information is made, and the outputting the image data is prohibited in a case where the selection for permitting inputting the biometric information is not made.

8 Claims, 11 Drawing Sheets

(56) References Cited

U.S. PATENT DOCUMENTS

| | | | |
|---|---|---|---|
| 2006/0250635 A1* | 11/2006 | Masuda et al. | 358/1.14 |
| 2007/0002368 A1* | 1/2007 | Corona | 358/1.15 |
| 2007/0035763 A1* | 2/2007 | Bard et al. | 358/1.15 |
| 2007/0133033 A1* | 6/2007 | Mizutani et al. | 358/1.14 |
| 2007/0206211 A1* | 9/2007 | Okutsu et al. | 358/1.14 |
| 2008/0151286 A1* | 6/2008 | Matsuo | 358/1.15 |

* cited by examiner

FIG. 6A
COPY IS RESTRICTED FOR THIS ORIGINAL.
FACE CAPTURING IS REQUIRED TO PERMIT
YOU TO COPY THIS ORIGINAL.
DO YOU CONSENT TO FACE CAPTURING? ~410

[YES]  [NO]

FIG. 6B
PLEASE STARE AT CAMERA LENS.
YOUR FACE IS BEING CAPTURED. ~411

FIG. 6C
COPYING IS IN PROGRESS. ~412

FIG. 6D
FACE CAPTURING IS UNSUCCESSFUL.
PLEASE SELECT WHETHER TO RE-CAPTURE
YOUR FACE OR CANCEL COPYING. ~413

[RE-CAPTURE]  [CANCEL]

FIG. 6E
COPYING HAS BEEN CANCELED. ~414

FIG. 13

| DIRECTORY INFORMATION |
|---|
| PROGRAM CODE CORRESPONDING TO STEPS IN FLOWCHART OF FIG. 5 |
| PROGRAM CODE CORRESPONDING TO STEPS IN FLOWCHART OF FIG. 8 |
| PROGRAM CODE CORRESPONDING TO STEPS IN FLOWCHART OF FIG. 9 |
| PROGRAM CODE CORRESPONDING TO STEPS IN FLOWCHART OF FIG. 10 |
|  |

IMAGE PROCESSING APPARATUS, METHOD FOR CONTROLLING THE SAME, AND STORAGE MEDIUM

BACKGROUND OF THE INVENTION

1. Field of the Invention

The present invention relates to an image processing apparatus, a method for controlling the same, and a storage medium.

2. Description of the Related Art

A user can conveniently print out or transmit image data using an image processing apparatus having a copy function or a data transmission function. However, if image data having confidential information is carelessly printed out or transmitted, the confidential information may be unintentionally leaked. To prevent the leakage of confidential information, an operation of outputting (e.g., printing out or transmitting) image data can be limitedly executed.

Meanwhile, Japanese Patent Application Laid-Open No. 2004-252501 discusses a technique of authenticating a user by previously registering a user's face image and then comparing a captured user's face image with the user's face image that has been previously registered. In such an authentication technique, the face of a user who wishes to output (e.g., print out or transmit) image data is captured. If the captured face image matches any one of previously registered face images, the operation of outputting the image data may be permitted. Otherwise, the operation of outputting the image data may be prohibited. This enables limiting a user who can execute the operation of outputting image data and restricting the operation of outputting image data.

However, when only users whose biometric information, such as a face image, has previously been registered are permitted to output image data as described above, a user whose biometric information has not been registered cannot output the image data. In this case, since a user who wishes to output image data is required to previously register her/his biometric information, user convenience may be decreased.

SUMMARY OF THE INVENTION

According to an aspect of the present invention, an image processing apparatus includes an outputting unit configured to output image data, an inputting unit configured to input user's biometric information, an accepting unit configured to accept, from a user, selection about whether to permit inputting the biometric information, and a control unit configured to perform control such that outputting the image data from the outputting unit is permitted in a case where the accepting unit accepts selection for permitting the inputting unit to input the biometric information, and the outputting the image data is prohibited in a case where the accepting unit does not accept selection for permitting the inputting unit to input the biometric information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 6A to 6E illustrate examples of a selection screen and a message screen displayed in the steps of the flowchart illustrated in FIG. 5.

FIG. 13 illustrates a memory map of a storage medium storing various data processing programs that can be read by an image processing apparatus according to an exemplary embodiment of the present invention.

DETAILED DESCRIPTION OF THE EMBODIMENTS

Various exemplary embodiments, features, and aspects of the invention will be described in detail below with reference to the drawings.

Figure 1:
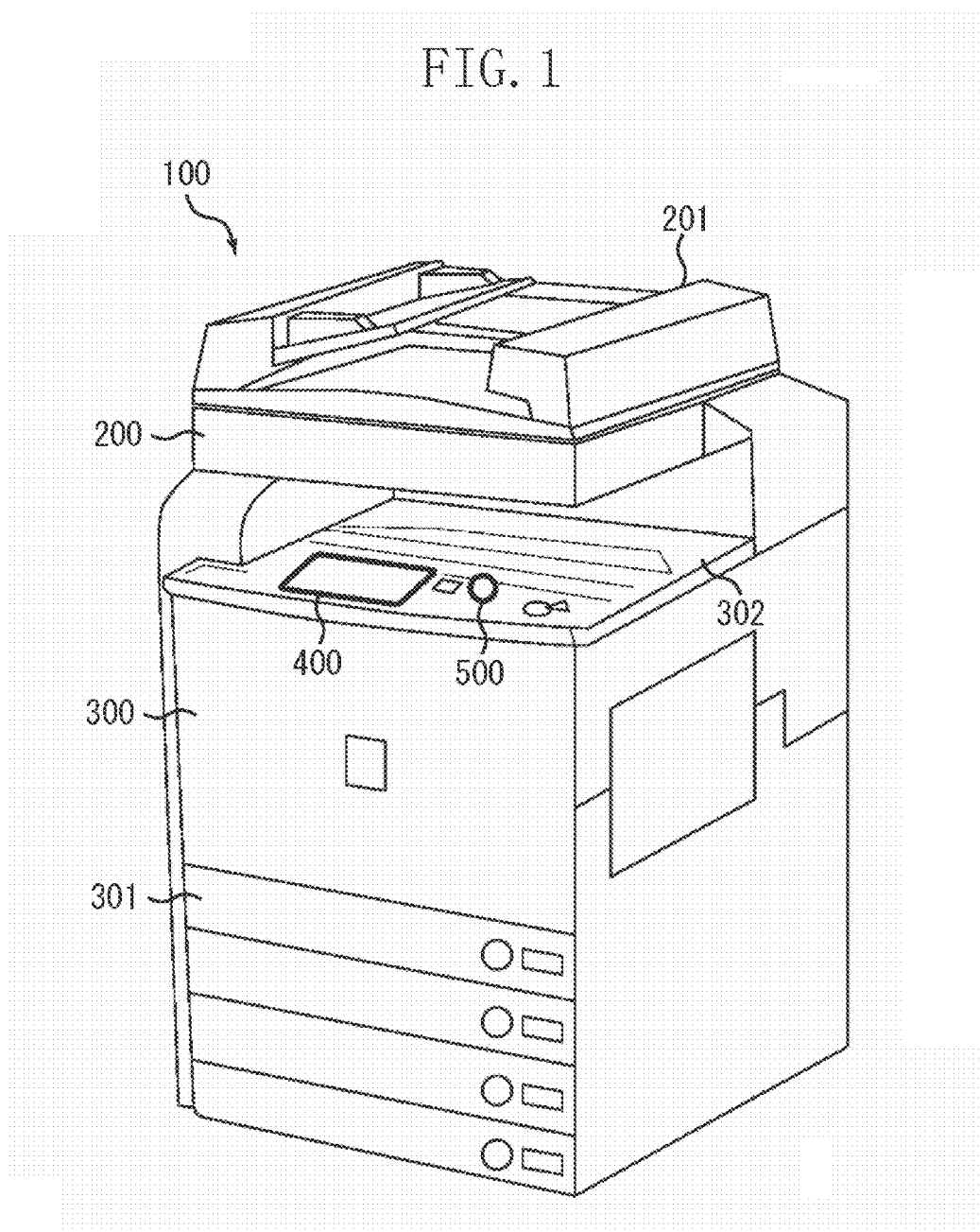
FIG. 1 is a perspective view illustrating appearance of an image processing apparatus according to a first exemplary embodiment of the present invention.

FIG. 1 is a perspective view illustrating appearance of an image processing apparatus according to a first exemplary embodiment of the present invention. As an image processing apparatus of the present exemplary embodiment, a digital multifunction peripheral (hereinafter, referred to as an MFP) 100 having multiple functions can be used.

The MFP 100 includes a scanner unit 200, a printer unit 300, an operation unit 400, and a camera unit 500, as illustrated in FIG. 1.

The scanner unit 200 has a feeder 201, which feeds an original to be read on a sheet-by-sheet basis. The original fed by the feeder 201 is illuminated by a light source (not illustrated) and scanned by a reading sensor such as a charge-coupled device (CCD). The reading sensor converts a light beam reflected from the original into an electric signal. Such an electric signal is an analog signal representing an image of the original, which is then converted into a digital signal by an image processing unit (not illustrated). The digital signal is then output as image data.

The printer unit 300 prints out the image expressed by the input image data on the paper fed from a single paper feed stage 301 and discharges the paper having the image printed thereon to a discharge tray 302. While the printer unit 300 is described as an electrophotographic type or an inkjet type, various other printing types may be also adopted without limitation.

The operation unit 400 includes a hard key group 402 having a start key or the like and a liquid crystal display (LCD) panel 401 having a touch panel capable of displaying a group of soft keys. If a user operates any one of a group of hard keys 402 or a group of the soft keys displayed on the liquid crystal display panel 401, information corresponding to the operation (e.g., information on an operation setup) is input. The liquid crystal display panel 401 displays various kinds of setup screens such as an operation mode setup screen and information on an operation mode or an operation state set up by a user.

The camera unit 500 has an image sensor (not illustrated) for capturing a user's face as information (i.e., biometric information) for identifying a user who uses the MFP 100.

Figure 2:
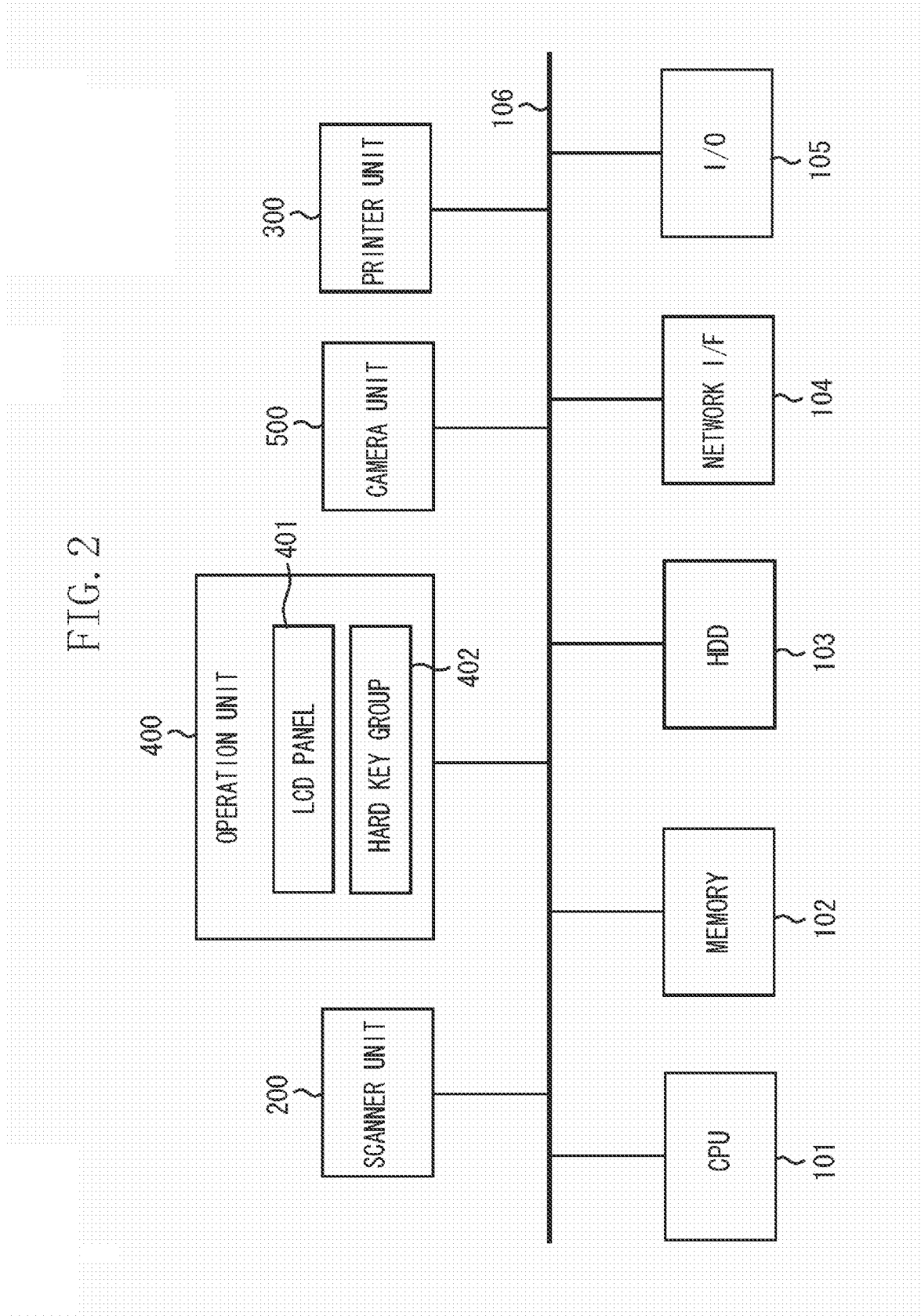
FIG. 2 is a block diagram illustrating an internal configuration of a multifunction peripheral (MFP) illustrated in FIG. 1.

An internal configuration of the MFP 100 will now be described with reference to FIG. 2. FIG. 2 is a block diagram illustrating an internal configuration of the MFP 100 illustrated in FIG. 1.

The MFP 100 includes a central processing unit (CPU) 101 as illustrated in FIG. 2. The CPU 101 is connected to a memory 102, a hard disk drive (HDD) 103, a network interface (I/F) 104, and an input/output (I/O) interface 105 via a system bus 106. Also, the CPU 101 is connected to the scanner unit 200, the printer unit 300, the operation unit 400, and the camera unit 500 via the system bus 106.

The memory 102 can be a random access memory (RAM) for providing a work area for the CPU 101 as well as temporarily storing image data. The HDD 103 stores programs or image data for executing various functions of the MFP 100. The network I/F 104 is an interface for transmitting/receiving data between devices over a network such as a local area network (LAN). The I/O interface 105 is an interface such as a universal serial bus (USB) for transmitting/receiving data between external devices.

The CPU 101, using a work area of the memory 102, performs control to execute various functions (such as a copy function, a printer function, a data transmission function, a facsimile function) based on a program stored in the HDD 103. For example, the CPU 101 performs control to read an original using the scanner unit 200 and transmit image data to the printer unit 300, thereby executing a copy operation for the original. The CPU 101 also performs control to read an original using the scanner unit 200 and transmit image data from the network I/F 104 or the I/O interface 105 to an external device, thereby executing data transmission. The CPU 101 also performs control to read an original using the scanner unit 200 and transmit image data from the network I/F 104 to another facsimile device, thereby executing facsimile transmission.

Figure 3A:
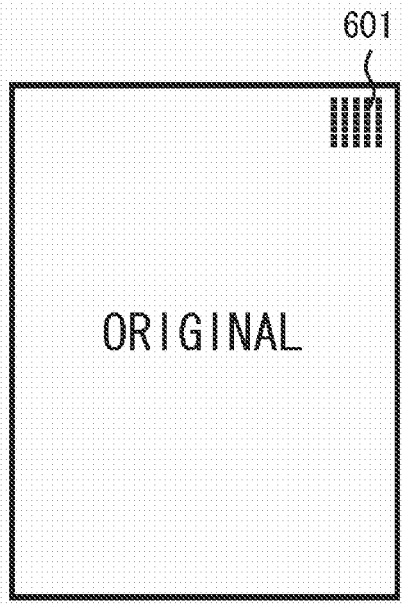
FIGS. 3A and 3B each illustrate an example of copy restriction information added to an original.
Figure 3B:
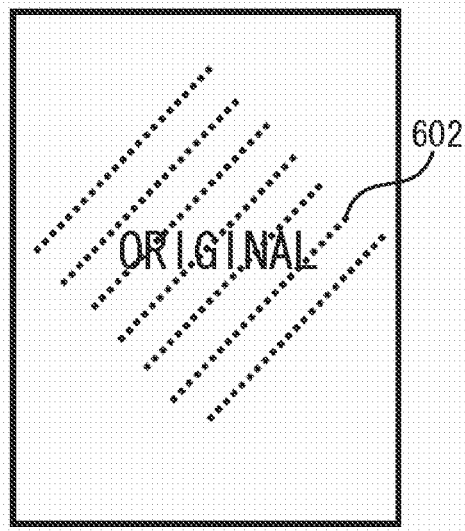
Figure 4:
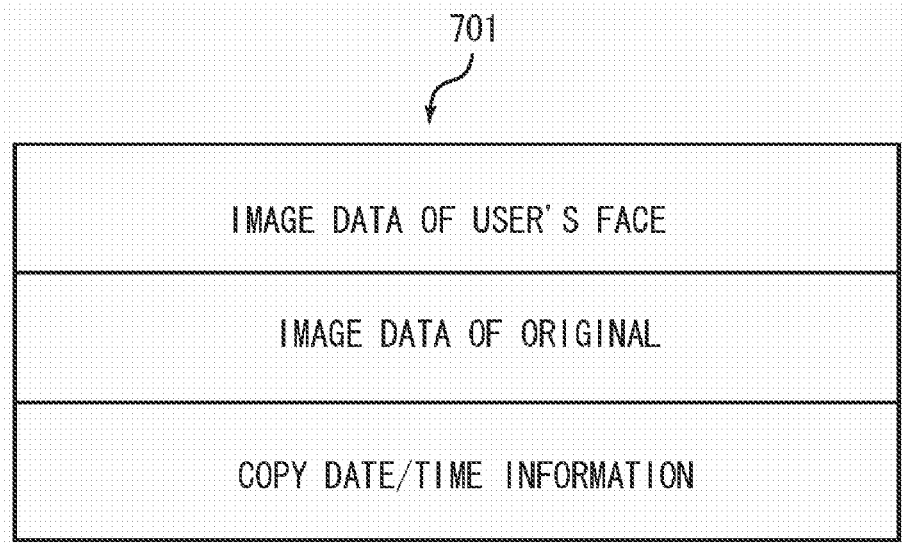
FIG. 4 illustrates face image data captured by a camera unit and information associated with the face image data.

The copy operation in the MFP 100 according to the present exemplary embodiment will now be described in brief with reference to FIGS. 3A, 3B, and 4. FIGS. 3A and 3B illustrate examples of copy restriction information added to an original. FIG. 4 illustrates image data of the face captured by the camera unit 500 and information associated with the image data.

According to the present exemplary embodiment, when the copy operation is executed, a user operates the hard or soft key of the operation unit 400 and set a copy mode in the MFP 100. Then, the user places an original on the feeder 201 of the scanner unit 200 and executes an output instruction by pressing the start key of the operation unit 400.

When the start key is pressed, the CPU 101 performs control to feed the original from the feeder 201 and read the original using the scanner unit 200. The CPU 101 analyzes image data of the original read by the scanner unit 200. Based on the result of the analysis, the CPU 101 determines whether the image data includes copy restriction information (i.e., specific information). The copy restriction information indicates that copy is restricted for the original.

The copy restriction information can include a visible or invisible two-dimensional code that can be analyzed by the MFP 100 (i.e., CPU 101). The copy restriction information is not limited to the two-dimensional code, but it can include any type of code as long as it can be analyzed by the MFP 100. For example, as illustrated in FIG. 3A, a visible two-dimensional code 601 can be added to the vicinity of an edge of the original as the copy restriction information. In addition, as illustrated in FIG. 3B, an invisible two-dimensional code 602 including a dot pattern can be embedded in the image as the copy restriction information. The invisible information can be read in a resolution larger than a predetermined level.

If the image read by the scanner unit 200 includes copy restriction information, the CPU 101 performs control to display, on the LCD panel 401, an inquiry screen for asking a user whether to consent to face capturing (for obtaining biometric information) using the camera unit 500. On the inquiry screen, if a user enters an answer that he/she consents to the face capturing, the CPU 101 performs control to execute the user's face capturing using the camera unit 500. If the face information of the user is obtained, the CPU 101 performs control to permit the user to copy the original and execute copying. That is, the CPU 101 performs control to send the image data of the read original to the printer unit 300, and the printer unit 300 then discharges a sheet having the image of the read original printed thereon.

As described above, if the original including the copy restriction information is to be copied, the user's face capturing becomes a precondition for the copy permission, and the camera unit 500 captures the user's face. The image data of the captured user's face is associated with the image data of the original to be copied (i.e., the image data of the original read by the scanner unit 200) and date/time information as illustrated in FIG. 4, so that management information 701 including the image data and the data/time information can be generated. The management information 701 is stored in the HDD 103. The management information 701 stored in the HDD 103 can be referred to, for example, when an administrator's password is entered. This enables searching for users who executed the copy operation for the original and the copy date and time information when the copy operation is to be executed for the original including the copy restriction information.

Figure 5:
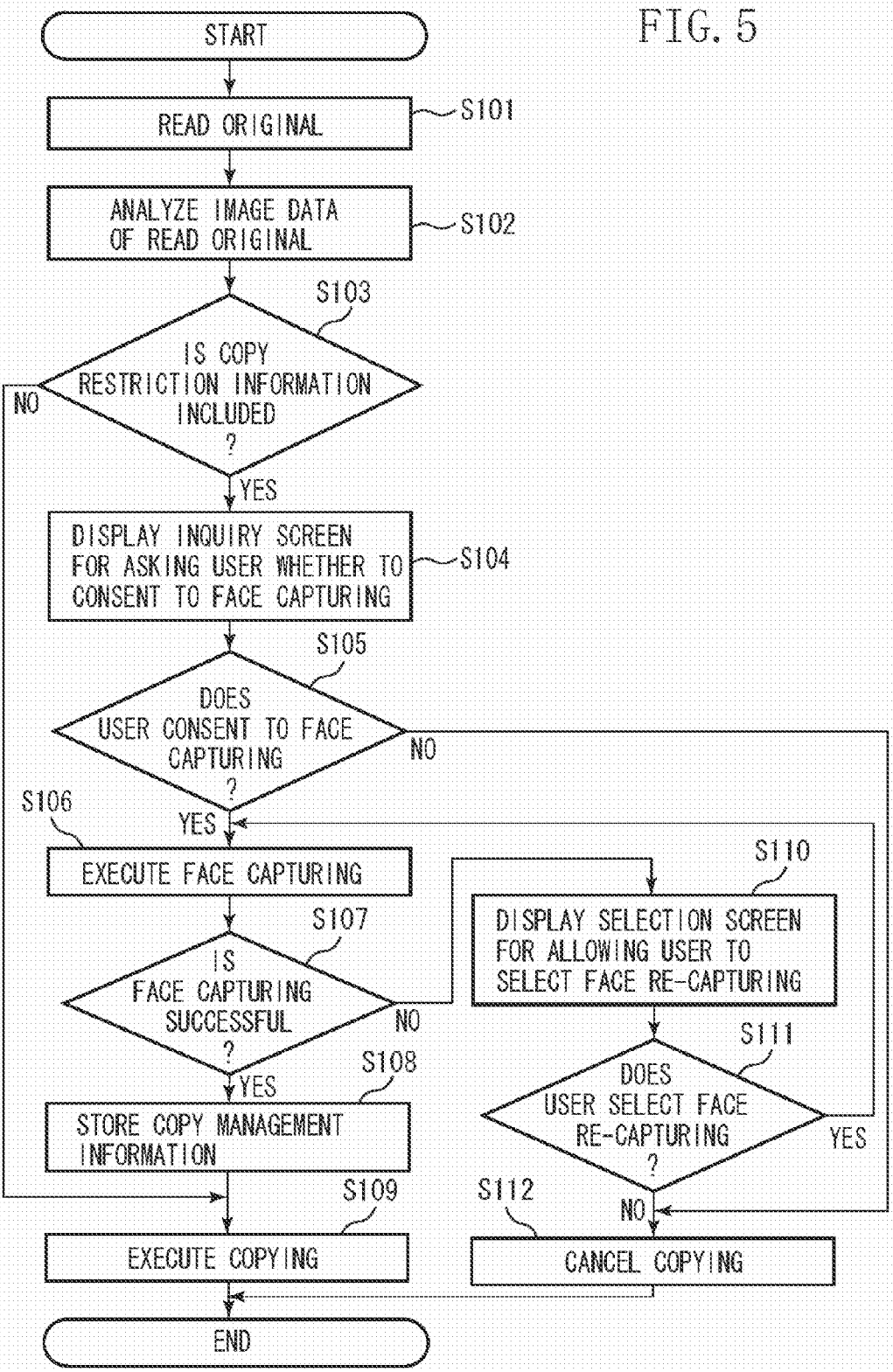
FIG. 5 is a flowchart illustrating a process for controlling a copy operation with a central processing unit (CPU) in the MFP illustrated in FIG. 1.

A process for controlling the copy operation by the CPU 101 in the MFP 100 will now be described with reference to FIGS. 5 and 6A to 6E. FIG. 5 is a flowchart illustrating a process for controlling the copy operation by the CPU 101 in the MFP 100 illustrated in FIG. 1. FIGS. 6A to 6E illustrate examples of a selection screen and a message screen displayed in procedures of the flowchart illustrated in FIG. 5. The procedures illustrated in the flowchart illustrated in FIG. 5 are executed by the CPU 101 based on a program stored in the HDD 103.

A user performs a copy setup for setting the number of copies to be made or a post-processing condition such as sorting or stapling by operating a hard or soft key of the operation unit 400 when the copy operation is to be executed. The user sets the original in the scanner unit 200 and presses the start key on the operation unit 400.

In step S101, the CPU 101 controls the scanner unit 200 to read the original when the start key is pressed. The image data of the original read by the scanner unit 200 is stored in the HDD 103. Then, in step S102, the CPU 101 analyzes the image data of the read original. In step S103, the CPU 101 determines whether the image data includes copy restriction information based on the result of the analysis.

If it is determined, in step S103, that the image data includes copy restriction information (YES in step S103), then in step S104, the CPU 101 performs control to display the inquiry screen 410 as illustrated in FIG. 6A on the LCD panel 401. The inquiry screen 410 is a screen for asking a user whether to consent to face capturing. The inquiry screen 410 provides a message indicating "COPY IS RESTRICTED FOR THIS ORIGINAL. FACE CAPTURING IS REQUIRED TO PERMIT YOU TO COPY THIS ORIGINAL. DO YOU CONSENT TO FACE CAPTURING?". In addition, the inquiry screen 410 provides "YES" and "NO" keys for entering an answer to the inquiry about whether to consent to the face capturing. The user presses the "YES" key when she/he consents to the face capturing. Meanwhile, the user presses the "NO" key when she/he does not consent to the face capturing. When either of the "YES" or "NO" key is pressed, the inquiry screen 410 is closed.

Subsequently, in step S105, the CPU 101 determines whether the user consents to the face capturing in response to pressing either of the "YES" or "NO" key on the inquiry screen 410. If the "YES" key is pressed, it is determined that the user consents to the face capturing. If the "NO" key is pressed, it is determined that the user does not consent to the face capturing but cancels the copy operation for the original.

If it is determined that the user consents to the face capturing in step S105 (YES in step S105), then in step S106, the CPU 101 controls the camera unit 500 to capture the user's face. The user's face can be captured by the camera unit 500 such that the face of the user who is operating the MFP 100 at the present time can be captured from its front side. It is also necessary to prompt a user to direct her/his face to the lens of the camera unit 500. For this purpose, for example, a message screen 411 indicating "PLEASE STARE AT CAMERA LENS. YOUR FACE IS BEING CAPTURED." is displayed on the LCD panel 401 as illustrated in FIG. 6B. Any face recognition technique well-known in the art can be employed to capture the user's face using the camera unit 500. When the face is recognized, the face capturing using the camera unit 500 is executed. If the face is not recognized within a predetermined time period, the capturing is ended. If the capturing is ended, the message screen 411 is closed.

In step S107, the CPU 101 determines whether the user's face capturing is successful based on the image data obtained by the face capturing. If it is determined that the user's face capturing is successful (YES in step S107), then in step S108, the CPU 101 generates management information 701 including the image data of the user's face captured by the camera unit 500 and stores the management information 701 in the HDD 103. According to the present exemplary embodiment, as illustrated in FIG. 4, the management information 701 includes the image data of the captured face, the image data of the original (i.e., image data of the original read by the scanner unit 200), and date and time information in association with one another.

In step S109, the CPU 101 performs control to execute the copy operation for the read original. In this step, the image data of the original read by the scanner unit 200 is transmitted to the printer unit 300, and the printer unit 300 prints out the image data on a sheet. In addition, for example, a message screen 412 indicating "COPYING IS IN PROGRESS" is displayed on the LCD panel 401 as illustrated in FIG. 6C. When the copy operation is completed, the CPU 101 performs control to close the message screen 412 and ends the present process.

If it is determined that the user's face capturing is unsuccessful in step S107 (NO in step S107), then in step S110, the CPU 101 performs control to display, for example, the selection screen 413 as illustrated in FIG. 6D on the LCD panel 401. The selection screen 413 is a screen for allowing a user to select whether to re-capture her/his face. The selection screen 413 provides a message "FACE CAPTURING IS UNSUCCESSFUL. PLEASE SELECT WHETHER TO RE-CAPTURE YOUR FACE OR CANCEL COPYING". In addition, the selection screen 413 provides "RE-CAPTURE" and "CANCEL" keys. In this case, when the user selects the face re-capturing, the "RE-CAPTURE" key is pressed. Meanwhile, when a user gives up and cancels the copy operation for the original, the "CANCEL" key is pressed. Either of the "RE-CAPTURE" or "CANCEL" key is pressed, the selection screen 413 is closed.

In step S111, the CPU 101 determines whether the user selects the face re-capturing in response to determining whether the "RE-CAPTURE" key is pressed on the selection screen 413. In this case, if it is determined that the user selects the face re-capturing (YES in step S111), the CPU 101 controls the process to return to step S106 and the camera unit 500 to re-capture the user's face.

If it is determined that the user does not select the face re-capturing in step S111 (NO in step S111), the user might have selected canceling the copy operation by pressing the "CANCEL" key. In this case, in step S112, the CPU 101 executes a process for canceling the copy operation for the read original. For example, the image data captured by the camera unit 500 or the image data of the read original stored in the HDD 103 is deleted. For example, a message screen 414 indicating "COPYING HAS BEEN CANCELED" is displayed on the LCD panel 401 as illustrated in FIG. 6E. Then, the CPU 101 performs control to close the message screen 414 and ends the present process.

If it is determined that the user does not consent to the face capturing in step S105 (NO in step S105), the CPU 101 determines that the user cancels the copy operation for the read original. Then, the process advances to step S112, in which the CPU 101 performs control to execute a process for canceling the copy operation for the read original.

If it is determined that the image does not include copy restriction information in step S103 (NO in step S103), the process advances to step S109, in which the CPU 101 performs control to execute the copy operation.

As described above, when an original including copy restriction information is copied, the CPU 101 permits the copy operation for the original only when the face capturing is successful. Information on the captured face is stored as management information in association with the copied image data. Based on the stored management information, a user who executes the copy operation can be tracked. This prevents the user from carelessly copying the original. Since the user is allowed to output the image data even when the face information has not been registered previously, degradation of user convenience can be prevented.

Figure 7A:
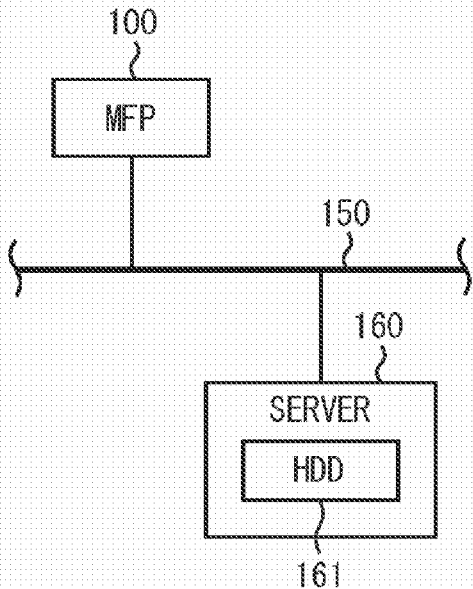
FIG. 7A illustrates a configuration for implementing copy management for an original including copy restriction information using a server.
Figure 7B:
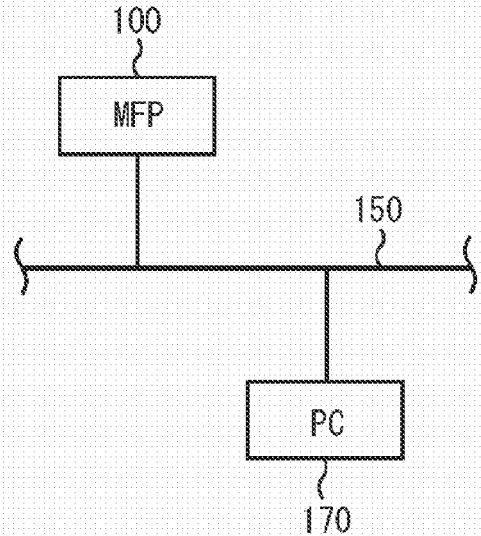
FIG. 7B illustrates a configuration for implementing copy management for an original including copy restriction information using a computer by an administrator.
Figure 8:
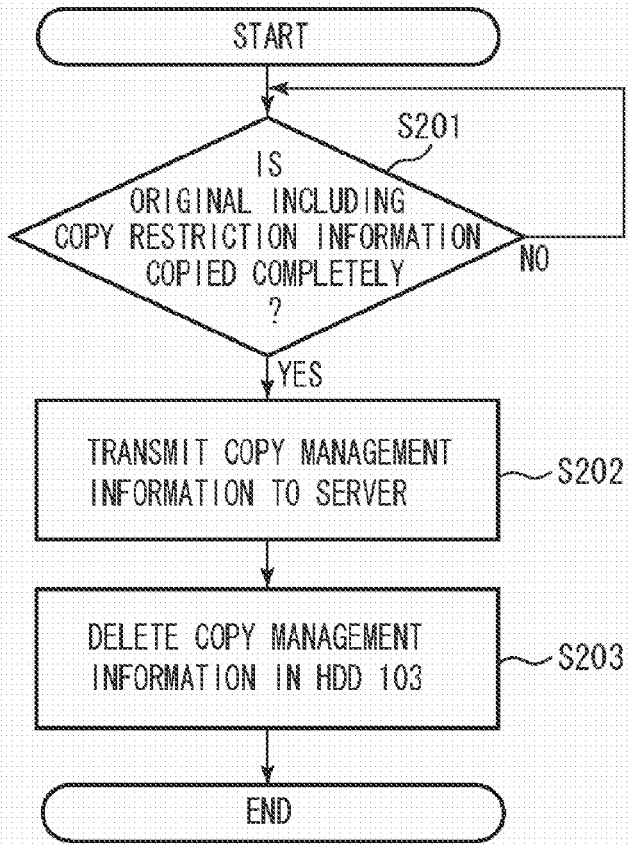
FIG. 8 is a flowchart illustrating a process for transmitting copy management information from the MFP when a server executes copy management for an original including copy restriction information.

Copy management for an original including copy restriction information using the copy management information will now be described with reference to FIGS. 7A, 7B, and 8. FIG. 7A illustrates a configuration for implementing copy management for an original including copy restriction information using a server. FIG. 7B illustrates a configuration for implementing copy management for an original including copy restriction information using a computer by an administrator. FIG. 8 is a flowchart illustrating a procedure for transmitting the copy management information from the MFP 100 when the server executes copy management for the original including copy restriction information. The procedures illustrated in the flowchart illustrated in FIG. 8 are executed by the CPU 101 based on a program stored in the HDD 103.

As described above, the HDD 103 in the MFP 100 stores copy management information including the image data of the user's face who executes the copy operation for the original including copy restriction information, the image data of the original, and date/time information. By referring to the copy management information stored in the HDD 103, the original that was copied can be identified, and when the original was copied by whom can also be identified.

As a method for referring to the copy management information stored in the HDD 103, for example, an administrator who manages the copy operation for the original including copy restriction information can access the HDD 103 using a password and can print out the copy management information in a management report style.

However, in an environment having a plurality of MFPs, it may take a long time to output the copy management information from each MFP. Therefore, a management device for executing the copy management can be provided independently from the MFPs 100 such that copy management for the original including the copy restriction information can be centrally executed using the copy management information. For example, as illustrated in FIG. 7A, a system can be constructed by connecting the MFP 100 to a sever 160 having an HDD 161 via a network 150 and executing copy management for the original including the copy restriction information using the server 160.

In this system, as illustrated in FIG. 8, the CPU 101 of the MFP 100 waits for end of the copy operation for the original including the copy restriction information in step S201. When the copy operation for the original is ended (YES in step S201), then in step S202, the CPU 101 performs control to transmit the management information stored in the HDD 103 from the network I/F 104 to the server 160 via the network 150. In this case, the address of the server 160 (i.e., destination information) is previously stored in the HDD 103. Alternatively, the address can be embedded into the image of the original together with the copy restriction information. The address (destination information) embedded into the image of the original is extracted by analyzing the image.

Subsequently, in step S203, the CPU 101 performs control to delete the management information in the HDD 103 and ends the present process.

When the server 160 receives the management information, the server 160 stores the management information in the HDD 161. The management information stored in the HDD 161 can be read and referred to by an administrator or any appropriate person responsible for management of the copy operation for the original including the copy restriction information. This enables identifying the copied original and identifying when the original was copied by whom with respect to the copy operation for the original including copy restriction information.

For example, as illustrated in FIG. 7B, instead of the server 160, a personal computer (PC) 170 used by an administrator can be utilized as a management device for managing the copy operation for the original including the copy restriction information. In this case, the MFP 100 is connected to the PC 170 via a network 150. When the copy operation is ended, the MFP 100 transmits an electronic mail from the network I/F 104 to the network 150 with the management information stored in the HDD 103 being attached. A destination of the electronic mail is the address (i.e., destination information) allocated to an administrator, and the address is previously stored in the HDD 103 of the MFP 100. The address of the administrator can be embedded into the image of the original together with the copy restriction information. The address (i.e., destination information) embedded into the image of the original is extracted by analyzing the image.

The administrator who receives the electronic mail can identify the copied original as well as identify when the original was copied by whom by referring to the copy management information attached to the electronic mail.

While, according to the present exemplary embodiment, the copy management information is transmitted to the server, or an electronic mail with the copy management information being attached is transmitted to the administrator after the copy operation for the original including the copy restriction information is ended, the present invention is not limited thereto. For example, in step S108 illustrated in FIG. 5, in the process executed before the copy operation is ended, the copy management information can be transmitted to the server, or an electronic mail with the copy management information being attached can be transmitted to the administrator.

In addition, in the MFP 100, the CPU 101 can search the HDD 103 on a regular basis. If the copy management information is stored in the HDD 103, the copy management information can be transmitted to the server, or an electronic mail with the copy management information being attached can be transmitted.

Figure 9:
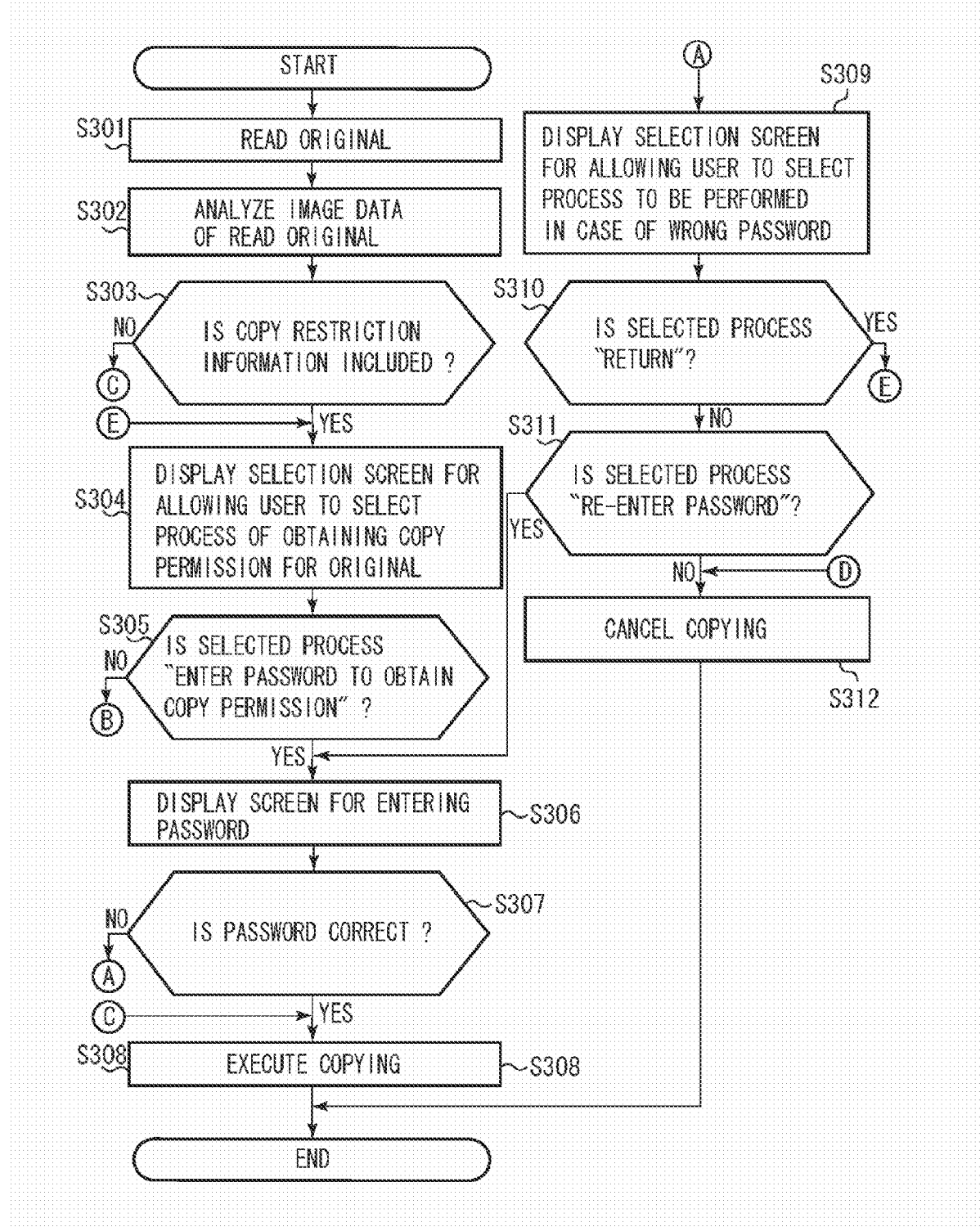
FIG. 9 is a flowchart illustrating a process for controlling a copy operation in an image processing apparatus according to a second exemplary embodiment of the present invention.
Figure 10:
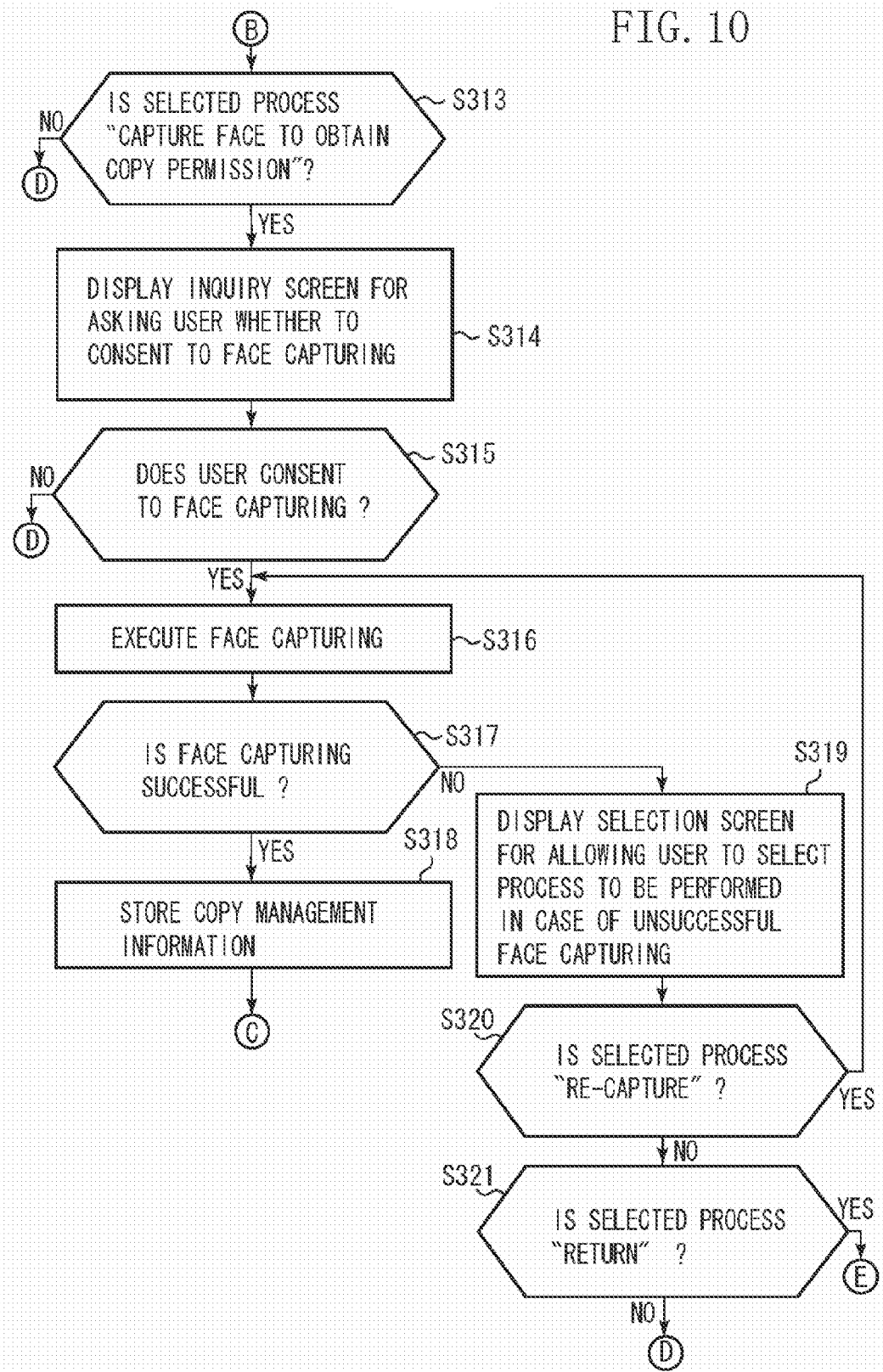
FIG. 10 is a flowchart illustrating a process for controlling a copy operation in an image processing apparatus according to the second exemplary embodiment of the present invention.

A second exemplary embodiment of the present invention will now be described with reference to FIGS. 9 to 12A to 12C. FIGS. 9 and 10 are flowcharts illustrating a process for controlling a copy operation in an image processing apparatus according to the second exemplary embodiment of the present invention. FIGS. 11A to 11E and 12A to 12C illustrate examples of a selection screen and a message screen displayed in the steps of the flowcharts illustrated in FIGS. 9 and 10. Herein, the procedures illustrated in the flowcharts illustrated in FIGS. 9 and 10 are executed by the CPU 101 based on a program stored in the HDD 103.

The second exemplary embodiment differs from the first exemplary embodiment in that a user is allowed to select any one of the password entering or the face capturing to permit the copy operation for the original including copy restriction information. In the following description, differences between the first and second exemplary embodiments will be described. However, since a general configuration of the second exemplary embodiment is similar to that of the first exemplary embodiment, its description will not be repeated.

In step S301, when a user sets the original in the scanner unit 200 and presses the start key of the operation unit 400, the CPU 101 controls the scanner unit 200 to execute a reading operation for the original as illustrated in FIG. 9. The image data of the original read by the scanner unit 200 is stored in the HDD 103. Then, in step S302, the CPU 101 analyzes the image data of the read original and, in step S303, determines whether the image data includes copy restriction information based on the analysis result.

Figure 11A:
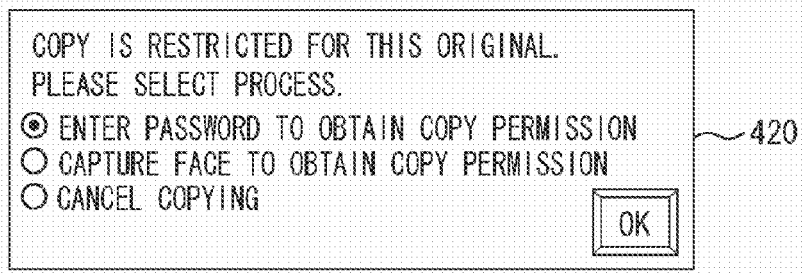
FIGS. 11A to 11E illustrate examples of a selection screen and a message screen displayed in the steps of the flowcharts illustrated in FIGS. 9 and 10.

If it is determined that the image includes the copy restriction information in step S303 (YES in step S303), then in step S304, the CPU 101 performs control to display the selection screen 420 as illustrated in FIG. 11A on the LCD panel 401. The selection screen 420 is a screen for allowing a user to select a process for obtaining copy permission for the original. The selection screen 420 provides a message indicating "COPY IS RESTRICTED FOR THIS ORIGINAL". In addition, the selection screen 420 provides processing items representing each process, such as "ENTER PASSWORD TO OBTAIN COPY PERMISSION", "CAPTURE FACE TO OBTAIN COPY PERMISSION", and "CANCEL COPYING", and an "OK" key. Each of the processing items has a check box. The user selects a process for obtaining copy permission for the original by marking the check box of the corresponding processing item. Then, the user presses the "OK" key to confirm the selected process. When the "OK" key is pressed, the selection screen 420 is closed.

Figure 11B:
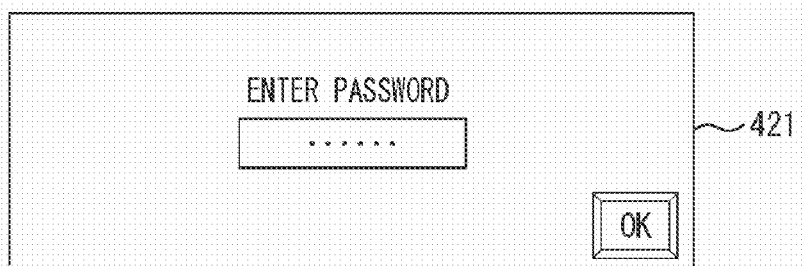

If the "OK" button is pressed on the selection screen 420, then in step S305, the CPU 101 determines whether the process selected by the user is "ENTER PASSWORD TO OBTAIN COPY PERMISSION". If it is determined that the selected process is "ENTER PASSWORD TO OBTAIN COPY PERMISSION" (YES in step S305), then in step S306, the CPU 101 performs control to execute the selected process. For example, the CPU 101 performs control to display a password input screen 421 as illustrated in FIG. 11B on the LCD panel 401. The password input screen 421 provides a password input box and an "OK" key. The user enters a password into the input box and presses the "OK" key to confirm the entered password. If the "OK" key is pressed, the password input screen 421 is closed.

Figure 11C:
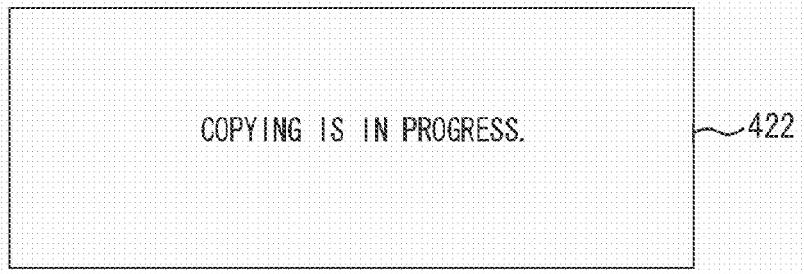

If the "OK" key is pressed, then in step S307, the CPU 101 determines whether the password entered through the password input screen 421 is identical to the password previously stored in the memory such as the HDD 103. If it is determined that both of the passwords are identical to each other (YES in step S307), then in step S308, the CPU 101 permits the copy operation for the read original and performs control to execute the copy operation for the original. At the present moment, for example, a message screen 422 indicating "COPYING IS IN PROGRESS" as illustrated in FIG. 11C is displayed on the LCD panel 401. If the copy operation is completed, the CPU 101 performs control to close the message screen 422 and ends the present process.

Figure 11D:
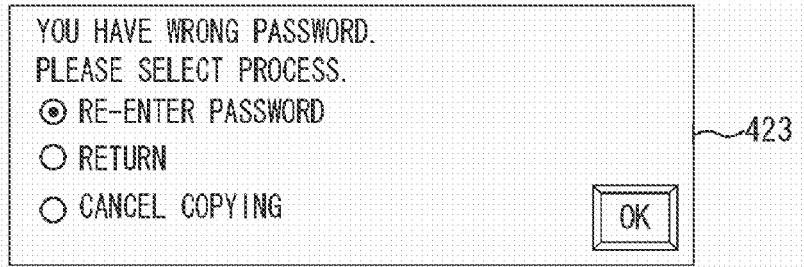

If it is determined that the entered password is not identical to the previously stored password in step S307 (NO in step S307), then in step S309, the CPU 101 performs control to display, for example, the selection screen 423 as illustrated in FIG. 11D on the LCD panel 401. The selection screen 423 is a screen for allowing a user to select a process when the password is not correct. The selection screen 423 provides a message indicating "YOU HAVE WRONG PASSWORD. PLEASE SELECT PROCESS". In addition, the selection screen 423 provides processing items representing each process, such as "RE-ENTER PASSWORD", "RETURN", and "CANCEL COPYING", and an "OK" key. Each of the processing items has a check box. The user selects a process to be executed when a wrong password is entered by marking the check box of the corresponding processing item. Then, the user presses the "OK" key to confirm the selected process. If the "OK" key is pressed, the selection screen 423 is closed.

If the "OK" key is pressed, then in step S310, the CPU 101 determines whether the process selected by the user through the selection screen 423 is "RETURN". If it is determined that the selected process is "RETURN" (YES in step S310), the process returns to step S304, in which the CPU 101 performs control to display the selection screen 420.

If it is determined that the process selected in step S310 is not "RETURN" (NO in step S310), then in step S311, the CPU 101 determines whether the selected process is "RE-ENTER PASSWORD". As a result, if it is determined that the selected process is "RE-ENTER PASSWORD" (YES in step S311), the process returns to step S306, in which the CPU 101 performs control to display the password input screen 421.

Figure 11E:
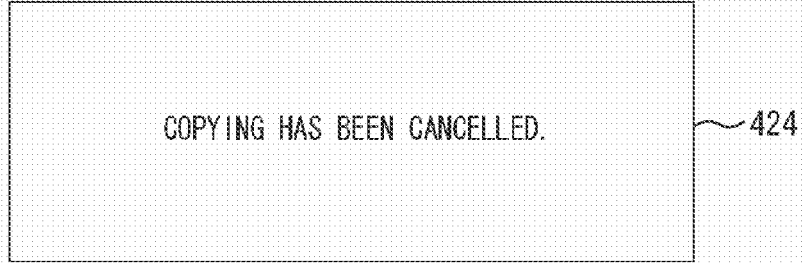

If it is determined that the selected process is not "RE-ENTER PASSWORD" in step S311 (NO in step S311), the selected process is "CANCEL COPYING". In this case, in step S312, the CPU 101 executes a process for canceling the copy operation for the read original. For example, the CPU 101 deletes the image data of the read original in the HDD 103. In addition, the CPU 101 performs control to display a message screen 424 indicating "COPYING HAS BEEN CANCELED" as illustrated in FIG. 11E on the LCD panel 401. Then, the CPI 101 performs control to close the message screen 424 and ends the present process.

Figure 12A:
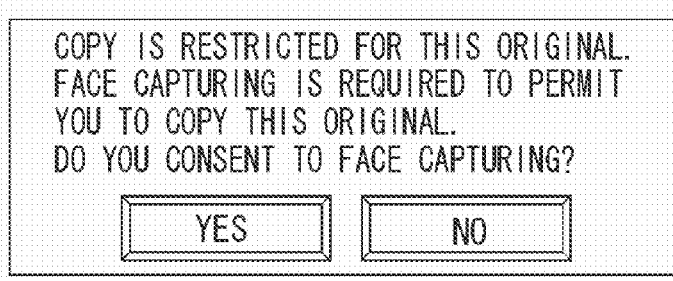
FIGS. 12A to 12C illustrate examples of a selection screen and a message screen displayed in the steps of the flowcharts illustrated in FIGS. 9 and 10.

If it is determined that the selected process is not "ENTER PASSWORD TO OBTAIN COPY PERMISSION" in step S305 (NO in step S305), the CPU 101 controls the process to advance to step S313 illustrated in FIG. 10. Then, the CPU 101 determines whether the selected process is "CAPTURE FACE TO OBTAIN COPY PERMISSION". If it is determined that the selected process is "CAPTURE FACE TO OBTAIN COPY PERMISSION" (YES in step S313), then in step S314, the CPU 101 performs control to display, for example, an inquiry screen 425 as illustrated in FIG. 12A on the LCD panel 401. The inquiry screen 425 is a screen for asking a user whether to consent to the face capturing and also the same screen as the inquiry screen 410 of the first exemplary embodiment.

In step S315, the CPU 101 determines whether the user consents to the face capturing in response to pressing either of the "YES" or "NO" key on the inquiry screen 425. If the "YES" key is pressed, it is determined that the user consents to the face capturing. If the "NO" key is pressed, it is determined that the user does not consent to the face capturing and cancels the copy operation of the original.

Figure 12B:
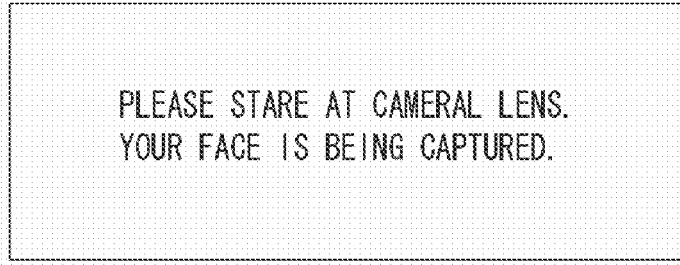

If it is determined that the user consents to the face capturing in step S315 (YES in step S315), then in step S316, the CPU 101 controls the cameral unit 500 to capture the user's face. Also, to prompt the user to direct her/his face to the lens of the camera unit 500, for example, a message screen 426 indicating "PLEASE STARE AT CAMERAL LENS. YOUR FACE IS BEING CAPTURED." as illustrated in FIG. 12B is displayed on the LCD panel 401. If the face capturing is ended, the message screen 426 is closed.

Then, in step S317, the CPU 101 determines whether the user's face capturing is successful based on the image data obtained through the face capturing. If it is determined that the user's face capturing is successful (YES in step S317), then in step S318, the CPU 101 performs control to generate copy management information including the image data of the user's face captured by the camera unit 500 and executes a process for storing the copy management information in the HDD 103. Then, the process advances to step S308 illustrated in FIG. 9, in which the CPU 101 performs control to copy the read original.

Figure 12C:
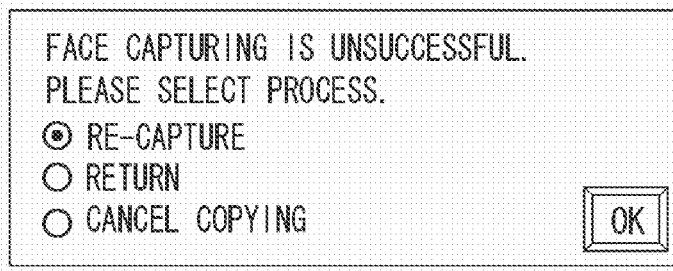

If it is determined that the user's face capturing is unsuccessful in step S317 (NO in step S317), then in step S319, the CPU 101 performs control to display, for example, a selection screen 427 as illustrated in FIG. 12C on the LCD panel 401. The selection screen 427 is a screen for allowing a user to select a process to be executed when the face capturing is unsuccessful. The selection screen 427 provides a message indicating "FACE CAPTURING IS UNSUCCESSFUL. PLEASE SELECT PROCESS". In addition, the selection screen 427 provides processing items representing each process, such as "RE-CAPTURE", "RETURN", and "CANCEL COPYING", and an "OK" key. Each of the processing items has a check box. The user selects a process to be executed when the face capturing is unsuccessful by marking the check box of the processing item. Then, the user presses the "OK" key to confirm the selected process. If the "OK" key is pressed, the selection screen 427 is closed.

If the "OK" key is pressed on the selection screen 427, then in step S320, the CPU 101 determines whether the process selected by the user on the selection screen 427 is "RE-CAPTURE". If it is determined that the selected process is "RE-CAPTURE" (YES in step S320), the process returns to step S316, in which the CPU 101 performs control to execute the face capturing using the camera unit 500.

If it is determined that the selected process is not "RE-CAPTURE" in step S320 (NO in step S320), then in step S321, the CPU 101 determines whether the selected process is "RETURN". If it is determined that the selected process is "RETURN" (YES in step S321), the process advances to step S304 illustrated in FIG. 9, in which the CPU 101 performs control to display the inquiry screen 420.

If it is determined that the selected process is not "RETURN" in step S321 (NO in step S321), the selected process is "CANCEL COPYING". In this case, the process advances to step S312 illustrated in FIG. 9, in which the CPU 101 performs control to execute a process for canceling the copy operation for the read original. For example, the image data of the read original stored in the HDD 103 is deleted. In addition, if there is the image data captured by the camera unit 500, the image data is also deleted.

If it is determined that the user does not consent to the face capturing in step S315 (NO in step S315), the CPU 101 determines that the copy operation for the read original is canceled. Then, the process advances to step S312 illustrated in FIG. 9, in which the CPU 101 performs control to cancel the copy operation for the read original.

If it is determined that the image data does not include the copy restriction information in step S303 (NO in step S303), the process advances to step S308, in which the CPU 101 performs control to copy the read original.

As described above, according to the present exemplary embodiment, a user whose password has been previously registered can select an option for authenticating a user who enters the password instead of the face capturing. As a result, a user can copy the restricted original by allowing the MFP 100 to authenticate a user using a password instead of face capturing.

A password can be registered for each user, or a common password can be registered for a plurality of users. If a password is registered for each user, the MFP 100 can identify the user who has entered the password when it is determined that the entered password is correct in step S307. As a result, when the image data is output after that, the MFP 100 stores the image data in the HDD 103 in association with a user's identification (ID) and date/time as the management information. As a result, the administrator can track when and what image data has been output by whom by referring to the HDD 103. Also, the management information stored in the HDD 103 can be transmitted to the server 160 or the PC 170 as described above. While the password method is employed as an example in the above description, any method other than the password method can be employed as long as it can be used to authenticate a user in combination with previously registered information.

Further, according to the aforementioned exemplary embodiment, the CPU 101 asks a user to capture her/his face (or to enter a password or capture her/his face according to the second exemplary embodiment) when the image data of the original includes copy restriction information. However, the present invention is not limited thereto. The CPU 101 can ask a user to capture her/his face (or to enter a password or capture her/his face according to the second exemplary embodiment) irrespective of whether the original includes copy restriction information when the copy operation is instructed. As a result, the original can be prevented from being carelessly copied even when the original does not include the copy restriction information.

While the exemplary embodiments have been described by exemplifying a case that the original including the copy restriction information is copied using the scanner unit 200, the present invention is not limited thereto. For example, even when the original including the restriction information is read, and the image data is transmitted to other devices, it is possible to perform control to ask a user to capture her/his face (or to enter a password or capture her/his face according to the second exemplary embodiment) to permit the image data processing. In addition, while the scanner unit 200 is used as an input source of the image data to copy the original according to the present exemplary embodiment, the present invention is not limited thereto. Alternatively, the present invention can be applied to a case where the MFP 100 prints out the image data read from an external memory such as a universal serial bus (USB) memory.

While the user's face is captured to obtain biometric information according to the present exemplary embodiment, the present invention is not limited thereto. Alternatively, a fingerprint, a vein, a hand geometry, a voice pattern, a retina, an iris, or a combination of them can be obtained from a user as the biometric information. Such biometric information can be obtained using corresponding biometric sensors. The MFP 100 stores face information, fingerprint information, vein information, voice pattern information, hand geometry information, retina information, iris information, or a combination of them obtained from a user in association with the output image data or the output date/time. As a result, it is possible to track when and what image data is output by whom afterwards.

While biometric information is stored in association with the output image data when the image data is output according to the aforementioned exemplary embodiment, the present invention is not limited thereto. Alternatively, the CPU 101 can perform memory control to store the image data without associating the biometric information obtained from a user with the image data.

It is to be understood that the present invention can also be accomplished by supplying a system or an apparatus with a storage medium in which a program code of software, which realize the functions of either of the aforementioned exemplary embodiments is stored, and causing a computer (or the CPU or micro processing unit (MPU)) of the system or apparatus to read out and execute the program code stored in the storage medium. For example, as illustrated in FIG. 13, the storage medium in which the program code is stored is supplied.

In this case, the program code itself read from the storage medium realizes the functions of either of the exemplary embodiments, and, therefore, the program code and the storage medium in which the program code is stored constitute the present invention.

Examples of the storage medium for supplying the program code include a floppy disk, a hard disk, a magnetic-optical disk, a compact disc read only memory (CD-ROM), a compact disc recordable (CD-R), a compact disc rewritable (CD-RW), a digital versatile disc read only memory (DVD-ROM), a digital versatile disc random access memory (DVD-RAM), a digital versatile disc rewritable (DVD-RW), a digital versatile disc rewritable (DVD+RW), a magnetic tape, a non-volatile memory card, and a ROM. Alternatively, the program code can be downloaded via a network.

Further, it is to be understood that the functions of either of the exemplary embodiments can be accomplished not only by executing the program code read out by a computer, but also by causing an operating system (OS) or the like which operates on the computer to perform a part or all of the actual operations based on instructions of the program code.

Further, it is to be understood that the functions of either of the aforementioned exemplary embodiments can be accomplished by writing program code read out from the storage medium into a memory provided on a function expansion board inserted into a computer or a memory provided in a function expansion unit connected to the computer and then causing a CPU or the like provided in the function expansion board or the function expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-164697 filed Jun. 24, 2008, which is hereby incorporated by reference herein in its entirety.

What is claimed is:

1. An image processing apparatus comprising:
a reading unit configured to read an original;
a printing unit configured to print using the image of the original read by the reading unit;
an inputting unit configured to input user's biometric information;
a display unit configured to display an inquiry screen for receiving an instruction to permit the inputting unit to input the user's biometric information in a case where image of the original read by the reading unit includes information indicating that copying of the original is prohibited; and
a control unit configured to control the inputting unit to input the user's biometric information and to control the printing unit to print using the image of the original read by the reading unit in a case where the instruction to permit the inputting unit to input the user's biometric information is received via the screen, wherein the inputting of the user's biometric information by the inputting unit and the printing of the image of the original read by the reading unit are not executed in a case where the instruction to permit the inputting unit to input the user's biometric information is not received via the screen.

2. The image processing apparatus according to claim 1, wherein the control unit performs control such that the printing using the image of the original read by the reading unit is executed without inputting of the user's biometric information by the inputting unit in a case where the image of the original read by the reading unit does not include the information.

3. The image processing apparatus according to claim 1, further comprising a storing unit configured to store the biometric information input by the inputting unit in association with the image of the original read by the reading unit.

4. The image processing apparatus according to claim 1, wherein the biometric information includes face information, fingerprint information, vein information, voice pattern information, hand geometry information, retina information, or iris information of the user, and
wherein the inputting unit receives input by sensing the biometric information using a biometric sensor.

5. A method for controlling an image processing apparatus, the method comprising:
reading an original;
printing using the image of the original read;
inputting user's biometric information;
displaying an inquiry screen for receiving an instruction to permit inputting a user's biometric information in a case where image of the original read includes information indicating that copying of the original is prohibited; and
inputting the user's biometric information and to control printing using the image of the original read in a case where the instruction to permit the inputting of the user's biometric information is received via the screen, wherein the inputting of the user's biometric information and the printing of the image of the original read are not executed in a case where the instruction to permit the inputting of the user's biometric information is not received via the screen.

6. A non-transitory computer-readable storage medium storing a computer-executable program for controlling an image processing apparatus, the computer-executable program comprising:
a code to read an original;
a code to print using the image of the original read;
a code to input user's biometric information;
a code to display an inquiry screen for receiving an instruction to permit inputting a user's biometric information in a case where image of the original read includes information indicating that copying of the original is prohibited; and
a code to input the user's biometric information and to control printing using the image of the original read in a case where the instruction to permit the inputting of the user's biometric information is received via the screen, wherein the inputting of the user's biometric information and the printing of the image of the original read are not executed in a case where the instruction to permit inputting the user's biometric information is not received via the screen.

7. The image processing apparatus according to claim 1, wherein the inputting unit includes a camera unit which captures face image data of a user.

8. The image processing apparatus according to claim 1, wherein the inquiry screen is for selecting whether or not to permit the inputting of the user's biometric information by the inputting unit.

* * * * *